US009957417B2

(12) United States Patent
Olson

(10) Patent No.: US 9,957,417 B2
(45) Date of Patent: *May 1, 2018

(54) FAST CURE ASPARTATE POLYSILOXANE HYBRID COATING

(71) Applicant: Bayer MaterialScience, LLC, Pittsburgh, PA (US)

(72) Inventor: Ahren Olson, Aliquippa, PA (US)

(73) Assignee: Covestro LLC, Pittsburgh, PA (US)

( * ) Notice: Subject to any disclaimer, the term of this patent is extended or adjusted under 35 U.S.C. 154(b) by 238 days.

This patent is subject to a terminal disclaimer.

(21) Appl. No.: 14/749,989

(22) Filed: Jun. 25, 2015

(65) Prior Publication Data

US 2015/0291846 A1    Oct. 15, 2015

Related U.S. Application Data

(62) Division of application No. 13/826,187, filed on Mar. 14, 2013, now Pat. No. 9,085,712.

(51) Int. Cl.

| *C09D 183/08* | (2006.01) |
| *B05D 1/02* | (2006.01) |
| *B05D 7/14* | (2006.01) |
| *B05D 5/00* | (2006.01) |
| *C09D 183/04* | (2006.01) |
| *C09D 175/04* | (2006.01) |
| *C08G 18/38* | (2006.01) |
| *C08K 3/34* | (2006.01) |

(52) U.S. Cl.
CPC ............. *C09D 183/08* (2013.01); *B05D 1/02* (2013.01); *B05D 5/00* (2013.01); *B05D 7/14* (2013.01); *C08G 18/3821* (2013.01); *C09D 175/04* (2013.01); *C09D 183/04* (2013.01); *C08K 3/34* (2013.01); *Y10T 428/31551* (2015.04)

(58) Field of Classification Search
CPC .. C09D 183/04; C09D 183/08; C09D 175/04; C08K 5/16; C08K 5/5419; C08K 5/544; C08K 3/44; C08G 18/3821; B05D 1/02; B05D 5/00; B05D 7/14; Y10T 428/31551; Y10T 428/31554; Y10T 428/31565; Y10T 428/31573; Y10T 428/3158; Y10T 428/31587; Y10T 428/31591; Y10T 428/31605
USPC ......... 428/423.1, 423.3, 423.7, 424.2, 424.6, 428/425.1, 425.6, 425.8, 425.9; 427/427.4; 524/588, 589; 523/206, 209, 523/213; 528/28, 33, 44
See application file for complete search history.

(56) References Cited

U.S. PATENT DOCUMENTS

| 2,832,754 | A | | 4/1958 | Jex |
| 2,971,864 | A | | 2/1961 | Speier |
| 3,404,130 | A | * | 10/1968 | Sigura ............... C08G 18/10 524/873 |
| 3,470,225 | A | | 9/1969 | Knorre et al. |
| 3,864,373 | A | | 2/1975 | Seiler et al. |
| 4,001,232 | A | | 1/1977 | Groegler et al. |
| 4,045,460 | A | | 8/1977 | Kleinstuck |
| 4,113,665 | A | | 9/1978 | Law et al. |
| 4,481,364 | A | | 11/1984 | Chu et al. |
| 4,940,615 | A | | 7/1990 | Hammer et al. |
| 5,364,955 | A | | 11/1994 | Zwiener et al. |
| 5,723,605 | A | | 3/1998 | Werbitzky et al. |
| 5,766,751 | A | | 6/1998 | Kotani et al. |
| 5,922,869 | A | | 7/1999 | Werbitzky et al. |
| 6,001,946 | A | | 12/1999 | Waldman et al. |
| 6,255,488 | B1 | | 7/2001 | Werbitzky et al. |
| 6,476,175 | B2 | | 11/2002 | Werbitzky et al. |
| 6,703,453 | B1 | * | 3/2004 | Schmalstieg ......... C07F 7/1836 524/425 |
| 9,085,712 | B2 | * | 7/2015 | Olson ................. C09D 183/04 |
| 2005/0137322 | A1 | | 6/2005 | Roesler et al. |
| 2007/0048504 | A1 | | 3/2007 | DiMario |
| 2009/0124727 | A1 | * | 5/2009 | Nennemann ......... C08G 18/289 523/206 |
| 2010/0317796 | A1 | | 12/2010 | Huang et al. |
| 2012/0208029 | A1 | | 8/2012 | Lin |
| 2013/0004777 | A1 | | 1/2013 | Sheth et al. |
| 2013/0203934 | A1 | | 8/2013 | Best et al. |
| 2014/0378611 | A1 | * | 12/2014 | Nakao ............... C08G 18/6254 524/839 |

FOREIGN PATENT DOCUMENTS

| DE | 1078568 | 3/1960 |
| DE | 2408480 A1 | 9/1975 |

(Continued)

OTHER PUBLICATIONS

Speier, John L. et al, "Syntheses of (3-Aminoalkyl)silicon Compounds", J. Org. Chem. vol. 36, No. 21, pp. 3120-3126 (1971).
Laas, Hans Josef et al, "The Synthesis of Aliphatic Polyisocyanates Containing Biuret, Isocyanurate or Uretdione Backbones for Use in Coatings", J. Prakt. Chem., 336 (1994), pp. 185-200.
Stoye, D. et al, "Lackharze, Chemie, Eigenschaften und Anwendungen", Carl Hanser Verlag, Munich, Vienna (1996).

(Continued)

*Primary Examiner* — Thao T Tran
(74) *Attorney, Agent, or Firm* — John E. Mrozinski, Jr.

(57) ABSTRACT

The present invention provides a hybrid two component coating composition comprising as component I, (A) an N-alkoxysilylalkyl-aspartic acid ester, (B) a polysiloxane having a molecular weight in the range of from about 400 to 10,000, and optionally (C) at least one hydrolyzable silane; and as component II, (D) a polyisocyanate having an average NCO functionality of 2.5 to 5.5 and an isocyanate content, based on solids, of 9 to 50 wt % and containing aliphatic polyisocyanates; and (E) a catalyst. Methods of making and applying the hybrid coating composition are also provided.

22 Claims, No Drawings

(56) References Cited

FOREIGN PATENT DOCUMENTS

| DE | 2749316 | 8/1978 |
|---|---|---|
| GB | 1008462 | 10/1965 |
| GB | 1121924 | 7/1968 |
| WO | 02051954 A2 | 7/2002 |

OTHER PUBLICATIONS

Bredereck, Hellmut et al, "Synthese von N.N.N'-Trimethyl-formamidin und Bis-dimethylamino-methoxy-methan (Aminalester)", Chem. Ber. 98, pp. 1078-1080 (1965).

* cited by examiner

FAST CURE ASPARTATE POLYSILOXANE HYBRID COATING

This application is a divisional of U.S. Ser. No. 13/826,187 filed Mar. 14, 2013.

BACKGROUND OF THE INVENTION

This invention pertains generally to hybrid coating compositions prepared from silane terminated polyaspartates, polysiloxane resins and polyisocyanates.

The paint industry requires sophisticated coatings, e.g., in the automobile industry, which possess an ideal combination of mechanical properties, such as very high hardness and abrasion resistance, excellent flexibility and very good chemical properties, such as solvent and chemical resistance.

It is known that purely inorganic coating compositions based on siloxanes, which have been produced by reacting hydrolyzable silane groups with water or dehydrating agents, are distinguished by high scratch resistance and chemical resistance (see for example U.S. Pat. No. 4,113,665). A disadvantage of these purely inorganic coatings is that they are brittle and prone to stress cracks. Furthermore, polysiloxane coatings can take hours to days to fully cure.

Hydrolyzable organofunctional silanes are key components for linking conventional organic polymer chemistry with silicone chemistry. Compounds of technical importance for this purpose are in particular those corresponding to the formula $(RO)_3Si(CH_2)_3$—Y wherein R is an alkyl group and Y is a functional group. Such compounds contain both hydrolyzable silyl groups, Si—(OR), which crosslink by "silane polycondensation" in the presence of moisture, and other functional groups (Y) which enable them to be chemically linked to conventional polymer materials. (See e.g., Angew. Chem. 98 (1986) 237-253.)

Alkoxysilanes containing amino groups are described, e.g., in J. Org. Chem. 36 (1971), p. 3120; DE-A-1,152,695; DE-A-1,271,712; DE-A-2,161,716; DE-A-2,408,480; DE-A-2,521,399; DE-A-2,749,316; and U.S. Pat. Nos. 2,832,754; 2,971,864; and 4,481,364. Common to all amino-functional silanes known in the art is the disadvantage of being extremely reactive with isocyanates. Therefore, it is difficult to react these alkoxysilanes with polyisocyanates due to the incompatibility, inhomogeneity and extremely high viscosities of the reaction products.

U.S. Pat. Nos. 5,364,955 and 5,766,751 describe silane-terminated resins that have been prepared by reacting NCO prepolymers with silane aspartates to form either urea or hydantoin groups. The silane aspartates are prepared by initially reacting amino-functional silanes with maleic or fumaric acid esters. The silane aspartates are then reacted with NCO prepolymers to form the moisture-curable resins. Condensation products of such aliphatic polyisocyanate-aminosilane adducts with hydrolyzable silanes exhibit an improved balance between high hardness, abrasion resistance and chemical resistance on the one hand and high flexibility on the other. The polyisocyanate-aminosilane adducts react with the hydrolyzable silanes via polycondensation to form flexible inorganic-organic hybrid coatings having high hardness and very good solvent resistance.

An object of the present invention is to improve upon prior art formulations to provide a moisture curable protective coating which does not have to be stoved and is hard cured within minutes of application, yet has a pot life of several hours. An additional object of the present invention is to provide a coating that has good visual quality and exhibits good scratch resistance such that it is suitable for use as an automotive coating, product finish, for industrial and commercial new construction and maintenance, or as OEM coating These objects may be achieved in accordance with the hybrid coatings of the present invention which are based on silane terminated polyaspartates, polysiloxane resins and polyisocyanates. These coatings hard cure within minutes and provide a chemically resistant, scratch resistant coating having a high gloss.

SUMMARY OF THE INVENTION

According to its major aspects, and briefly stated, the present invention includes a hybrid coating composition containing:
(I) a first Component comprising (A) an N-alkoxysilylalkyl-aspartic acid ester, (B) a polysiloxane having a molecular weight in the range of from about 400 to 10,000, and optionally (C) at least one hydrolyzable silane; and
(II) a second Component comprising (D) a polyisocyanate having an average NCO functionality of 2.5 to 5.5 and an isocyanate content, based on solids, of 9 to 50 wt % and containing aliphatic polyisocyanates; and (E) a catalyst.

The N-alkoxysilylalkyl-aspartic acid ester (A) may be prepared by the reaction of equimolar quantities of:
(i) amino-alkyl alkoxysilanes corresponding to formula (I)

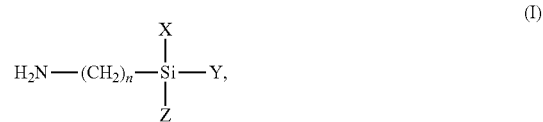

in which X, Y and Z represent identical of different organic groups which are inert with respect to isocyanate groups at a temperature below 100° C., provided that at least one of these groups is an alkoxy group, and n represents an integer of from 2 to 4, and
(ii) a maleic or fumaric acid ester.

The polysiloxane (B) corresponds to formula (II)

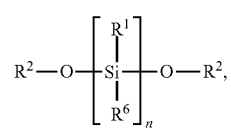

wherein $R^1$ and $R^6$ are each independently selected from the group comprising hydroxyl, alkyl, aryl and alkoxy radicals having up to six carbon atoms, and each $R^2$ is independently selected from the group comprising hydrogen, alkyl and aryl radicals having up to six carbons, and n is selected so that the molecular weight for the polysiloxane is in the range of from about 400 to 10,000.

The at least one hydrolyzable silane (C) corresponds to formula (III)

wherein X represents $C_1$ to $C_4$ alkyl and Q represents $C_1$ to $C_8$ alkyl, phenyl, methoxy, or ethoxy, and/or a hydrolyzate/condensate obtained therefrom. The catalyst (E) may be an amidine compound which has amidino functional group, —HN=CNH$_2$, or an organotin compound.

The present invention is also directed to methods of preparing the hybrid coating composition, methods of coating a substrate, and coated substrates.

DETAILED DESCRIPTION OF THE PREFERRED EMBODIMENTS

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances:

In the following description, the present invention is set forth in the context of various alternative embodiments and implementations involving a two component hybrid coating composition containing (I) a first Component comprising an N-alkoxysilylalkyl-aspartic acid ester, a polysiloxane and optionally at least one hydrolyzable silane, and (II) a second Component comprising a polyisocyanate and a catalyst; a method of coating a substrate using the hybrid coating composition; and a substrate coated with the hybrid coating composition.

The polyaspartate-polysiloxane hybrid coating composition of the present invention offers the fast cure of a polyaspartate coating and the superior durability of a polysiloxane coating. For example, the polyaspartate provides the hybrid coating composition with cure times which are several orders of magnitude faster than those of the polyurethane or polysiloxane prior art compositions. The hybrid coating composition is a two component system that when mixed may have a pot-life of several hours, but when applied to a substrate may come to a hard dry within minutes. Further, the hybrid coating composition offers a low volatile organic compound content (e.g. VOC of about 1.25 lb/gallon), and is isocyanate-free upon cure. Certain formulations of the two component hybrid coating composition of the present invention may also be isocyanate-free at the point of application.

Thus, an embodiment of the present invention is a hybrid coating composition containing (I) a first Component comprising (A) an N-alkoxysilylalkyl-aspartic acid ester, (B) a polysiloxane having a molecular weight in the range of from about 400 to 10,000, and optionally (C) at least one hydrolyzable silane; and (II) a second Component comprising (D) a polyisocyanate having an average NCO functionality of 2.5 to 5.5 and an isocyanate content, based on solids, of 9 to 50 wt % and containing aliphatic polyisocyanates; and (E) a catalyst.

Suitable N-alkoxysilylalkyl-aspartic acid esters (A) in the hybrid coating composition of the present invention are compounds prepared by the reaction of equimolar amounts of (i) amino-alkyl alkoxysilanes corresponding to formula (I)

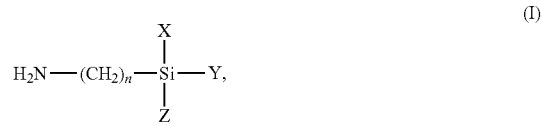

in which X, Y and Z represent identical of different organic groups which are inert with respect to isocyanate groups at a temperature below 100° C., provided that at least one of these groups is an alkoxy group, and n represents an integer of from 2 to 4, and (ii) a maleic or fumaric acid ester.

Maleic or fumaric acid esters suitable for making the N-alkoxysilylalkyl-aspartic acid esters (A) are compounds having the formula

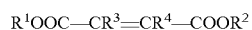

where $R^1$, $R^2$, $R^3$ and $R^4$ are groups that are "inert to isocyanate groups under the reaction conditions," which means that these groups do not have Zerevitinov-active hydrogens (CH-acid compounds; cf. RÖmpp Chemie Lexikon, Georg Thieme Verlag Stuttgart), such as OH, NH or SH. $R^1$ and $R^2$ in the above formula are, independently of one another, preferably $C_1$ to $C_{10}$ alkyl residues, more preferably methyl or ethyl residues; $R^3$ and $R^4$ are preferably hydrogen.

In preferred embodiments, the variables X, Y and Z in formula (I) represent alkyls or alkoxy groups having 1 to 4 carbon atoms, with the proviso that at least one is an alkoxy group and n represents 3. In preferred embodiments, the maleic and/or fumaric acid ester may be an optionally substituted maleic or fumaric acid ester including dimethyl, diethyl, di-n-butyl, diamyl, di-2-ethylhexyl and mixed esters based on mixture of these and/or other alkyl groups of maleic or fumaric acid, and the corresponding maleic and fumaric acid esters substituted by methyl in the 2- and/or 3-position.

In a particularly preferred embodiment, the amino-alkyl alkoxysilane is gamma-aminopropyl trimethoxysilane or gamma-aminopropyl triethoxysilane and the maleic and/or fumaric acid ester is dimethyl, diethyl or di-n-butyl maleate. Suitable methods of preparing N-alkoxysilylalkyl-aspartic acid esters are known and are detailed in U.S. Pat. No. 5,364,955.

Thus, in preferred embodiments of the hybrid coating composition of the present invention, the N-alkoxysilylalkyl-aspartic acid ester (A) may be N-(3-Trimethoxysilylpropyl)-aspartic acid dimethyl ester, N-(3-Trimethoxysilylpropyl)-aspartic acid diethyl ester, N-(3-Trimethoxysilylpropyl)-aspartic acid di-n-butyl ester, N-(3-Triethoxysilylpropyl)-aspartic acid dimethyl ester, N-(3-Triethoxysilylpropyl)-aspartic acid diethyl ester, and N-(3-Triethoxysilylpropyl)-aspartic acid di-n-butyl ester.

Suitable polysiloxanes (B) in the hybrid coating composition of the present invention are polysiloxanes corresponding to formula (II)

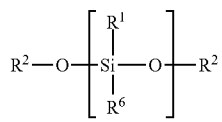

wherein $R^1$ and $R^6$ are each independently selected from the group comprising hydroxyl, alkyl, aryl and alkoxy radicals having up to six carbon atoms, and each $R^2$ is independently selected from the group comprising hydrogen, alkyl and aryl radicals having up to six carbons, and n is selected so that the molecular weight for the polysiloxane is in the range of from about 400 to 10,000. In preferred embodiments, the polysiloxane (B) has $R^1$ and $R^2$ which are methyl and $R^6$ which is phenyl.

Also suitable as polysiloxanes of formula (II) are compounds having a molecular weight ranging from 500 to 6,000 and an alkoxy content ranging from 10 to 50%. Examples of such polysiloxanes include the alkoxy- and silanol-functional polysiloxanes. Suitable alkoxy-functional polysiloxanes include, but are not limited to: DC-3074 and DC-3037 from Dow Corning; Silres SY-550, and SY-231 from Wacker Silicone; Rhodorsil Resin 10369 A, Rhodorsil 48V750, 48V3500 from Rhodia Silicones; and SF1147 from General Electrics. Suitable silanol-functional polysiloxanes include, but are not limited to, Silres SY 300, Silres SY 440, Silres MK and REN 168 from Wacker Silicone, Dow Corning's DC-840, DC233 and DG431 HS silicone resins and DC-Z-6018 intermediate and Rhodia Silicones' Rhodorsil Resin 6407 and 6482 X.

Suitable as hydrolyzable silanes (C) in the hybrid coating composition of the present invention are hydrolyzable silanes corresponding to formula (III)

wherein the organic group $R^4$ may be, for example, an alkyl group, a cycloalkyl group, an aryl group or a vinyl group. Here, the alkyl group may be linear or branched. The alkyl group may be, for example, a methyl group, an ethyl group, a n-propyl group, an i-propyl group, a n-butyl group, an i-butyl group, a s-butyl group, a t-butyl group, a pentyl group, a hexyl group, a heptyl group or an octyl group. A preferred alkyl group is one having from 1 to 4 carbon atoms. The cycloalkyl group may be, for example, preferably a cyclohexyl group, a cycloheptyl group or a cyclooctyl group. The aryl group may be, for example, a phenyl group. In preferred embodiments, the organic group $R^4$ represents $C_1$ to $C_4$ alkyl and Q represents $C_1$ to $C_8$ alkyl, phenyl, methoxy, or ethoxy, and/or a hydrolyzate/condensate obtained therefrom.

In certain embodiments, the above respective functional groups for the hydrolyzable silane of formula (III) may have optional substituents. Such substituents may be, for example, a halogen atom (such as a chlorine atom, a bromine atom or a fluorine atom), a (meth)acryloyl group, a mercapto group, and an alicyclic group.

Specific examples of hydrolyzable silanes of formula (III) include, for example, methyl trimethoxysilane, methyl triethoxysilane, ethyl trimethoxysilane, ethyl triethoxysilane, n-propyl trimethoxysilane, n-propyl triethoxysilane, i-propyl trimethoxysilane, i-propyl triethoxysilane, γ-chloropropyl trimethoxysilane, γ-chloropropyl triethoxysilane, vinyl trimethoxysilane, vinyl triethoxysilane, 3,3,3-trifluoropropyl trimethoxysilane, 3,3,3-trifluoropropyl triethoxysilane, cyclohexyl trimethoxysilane, γ-methacryloxypropyl trimethoxysilane, γ-methacryloxypropyl triethoxysilane, γ-mercaptopropyl trimethoxysilane, γ-mercaptopropyl triethoxysilane, phenyl trimethoxysilane, phenyl triethoxysilane, dimethyl dimethoxysilane, dimethyl diethoxysilane, diethyl dimethoxysilane, diethyl diethoxysilane, diphenyl dimethoxysilane, diphenyl diethoxysilane, methylphenyl dimethoxysilane and dimethyl dipropoxysilane. Preferred is methyl trimethoxysilane, methyl triethoxysilane or dimethyl dimethoxysilane.

Suitable polyisocyanates (D) in the hybrid coating composition of the present invention are isocyanates, or mixtures thereof, having an average NCO functionality of 2.0 to 5.5, preferably 2.8 to 5.0 and more preferably of 3.0 to 4.5. The NCO content, based on the solids content of polyisocyanate, is 2 to 50 wt. %, preferably 10 to 30 wt. % and more preferably 11 to 25 wt. %. The content of monomeric diisocyanate in the polyisocyanate is preferably less than 10 wt %, more preferably less than 2 wt % and most preferably less than 0.5 wt. %.

Suitable polyisocyanates include polyisocyanate adducts containing biuret, isocyanurate, iminooxadiazine dione, uretdione, allophanate and/or urethane groups. The urethane groups are based on the reaction products of monomeric isocyanates with molecular weight polyfunctional alcohols such as trimethylol propane, 1,6-hexanediol, 1,5-pentanediol, diethylene glycol, triethylene glycol, 2,2,4-trimethyl-1,3-propanediol, neopentyl glycol and mixtures thereof. These polyisocyanate adducts are described, for example, in J. Prakt. Chem., 1994, 336. 185-200, and "Lackharze, Chemie, Eigenschaften and Anwendungen", publ. D. Stoye, W. Freitag, Hanser Verlag, Munich, Vienna 1996.

The polyisocyanate adducts may be prepared by the oligomerization of monomeric diisocyanates, as described for example in J. Prakt. Chem., 336 (1994) 185-200. Examples of suitable monomeric diisocyanates include 1,4-butane diisocyanate, 1,6-hexane diisocyanate (HU), 3-isocyanatomethyl-3,3,5-trimethylcyclohexylisocyante (isophorone diisocyanate, IPDI), 2-methyl-1,5-pentane diisocyanate, 2,2,4trimethyl-hexamethylene diisocyanate (TMDI), 1,1 2-dodecane diisocyanate, bis(isocyanatomethyl)norbornane and 4,4'-diisocyanato-cyclohexyl methane.

Particularly preferred are polyisocyanates containing isocyanurate groups (trimers) which have an NCO functionality of 3.0 to 4.5, a monomer content of <2 wt %. They may be prepared by the trimerization process described in EP 330, 996.

Polyisocyanates (D) of the hybrid coating composition of the present invention may also contain other di- or polyisocyanates, for example, monomeric diisocyanates such as 1,4-butane diisocyanate, 1,6-hexane diisocyanate (HDI), 3-isocyanatomethyl-3,3,5-trimethylcyclohexyl isocyanate (isophorone diisocyanate or IPDI), 2-methyl-1,5-pentane diisocyanate, 2,2,4-trimethyl-hexamethylene diisocyanate (TMDI), 1,12-dodecane diisocyanate and bis(isocyanatomethyl)norbornane; triisocyanates such as 4-isocyanatomethyl-1,8-octane diisocyanate. The mixtures should satisfy the preceding requirements regarding NCO content, NCO functionality and monomer content.

For better handling, the polyisocyanate (mixtures) can be diluted with up to 50 wt. % of conventional solvents. Suitable solvents are those that are not reactive towards NCO groups, such as butyl acetate, ethyl acetate, 1-methoxy-2-propyl acetate, toluene, 2-butanone, xylene, 1,4-dioxane, N-methyl pyrrolidone, dimethyl acetamide, dimethyl formamide and dimethyl sulphoxide.

Suitable as catalysts (E) in the hybrid coating composition of the present invention are acidic or basic catalysts which may be used to promote the hydrolysis reactions of the OR groups of the aminoalkyl alkoxysilanes (A)(i) and the polysiloxanes (B) and the condensation reaction between silanols to form a film. Examples include acids such as paratoluene sulfonic acid; metallic salts such as dibutyl tin dilaurate; tertiary amines such as triethylamine or triethylene diamine; amidine containing compounds such as 1,5-diazabicyclo [4.3.0]-non-5-ene; and mixtures of these catalysts.

Thus, suitable as the catalyst (E) may be the organotin compounds corresponding to the formula

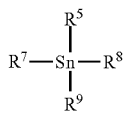

wherein $R^5$ and $R^7$ are selected from the group consisting of alkyl, aryl, alkoxy groups, arylalkoxy, having up to twelve carbon atoms, and $R^8$ and $R^9$ are selected from the same groups as $R^5$ and $R^7$, or from a group consisting of inorganic atoms such as halogens, sulfur or oxygen.

Organotin compounds useful as catalysts include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis(isooctylthioglycolate), butyltin trichloride, butylstannoic acid, dioctyltin dichloride, dioctyltin oxide, dioctyltin dilaurate, dioctyltin maleate polymer, dioctyltin bis(isooctylthioglycolate)dioctyltin sulfide, dibutyltin 3-mercapto propionate.

Also suitable as the catalyst (E) may be compounds containing N,N,N'-trisubstituted amidine groups and having an amidine group content (calculated as $CN_2$, molecular weight=40) of 12.0 to 47.0 wt. %, preferably of 15.0 to 40.0 wt. %. Suitable catalysts include any optionally substituted amidine bases bearing alkyl, aralkyl or aryl residues, in which CN double bond of the amidine structure may be arranged both as part of an open-chain molecule and as a constituent of a cyclic or bicyclic system or also exocyclically on a ring system. Mixtures of amidines may also be used.

Suitable amidine catalysts, in which the CN double bond is present as part of an open-chain molecule, include N,N-dimethyl-N'-phenylformamidine or N,N,N'-trimethylformamidine, the production of which is described, for example, in Chem. Ber. 98, 1078 (1965). Examples of suitable amidines, in which the CN double bond is a constituent of a cyclic system include 2-methyltetrahydropyrimidines substituted in position 1, which may be obtained according to DE-A 2,439,550 by reacting N-monosubstituted 1,3-propanediamines with acetoacetic acid derivatives, or monocyclic amidine bases, which may be obtained according to DE-A 1,078,568 by reacting carbamoyl chlorides obtained from secondary amines with lactams. Suitable catalysts, in which the CN double bond is arranged exo-cyclically on a ring system, include imines of N-alkyl-substituted lactams, such as 2-methylimino-1-methylpyrrolidone, the production of which is described in Chem. Ber. 101, 3002 (1968).

Preferably, however, the catalyst (E) may be selected from bicyclic catalysts containing N,N,N'-trisubstituted amidine structures and corresponding to the formula below wherein m represents an integer from 1 to 9, preferably 1 to 3 and n represents an integer from 1 to 3, preferably 2.

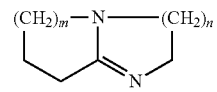

The production of these bicyclic amidines is known and described, for example, in DE-A 1,545,855 or EP-A 662, 476. 1,5-diazabicyclo 4.3.0|-non-5-ene (DBN) is a particularly preferred catalyst (E) for the hybrid coating compositions according to the present invention.

The catalyst (E) may be used in the coatings according to the invention in a quantity of 0.05 to 5 wt. %, preferably of 0.1 to 3 wt. %, based on the total weight of the coating composition.

Polyisocyanates (D) are reacted with at least 0.5 to 1.5 equivalents, based on the amino groups of the N-alkoxysilylalkyl-aspartic acid esters (A) and the isocyanate groups of the polyisocyanate (D). Preferably polyisocyanates (D) are reacted with at least 0.8 equivalents and more preferably at least 0.9 equivalents, based on the amino groups of the N-alkoxysilylalkyl-aspartic acid esters (A) and the isocyanate groups of the polyisocyanate (D).

Upon mixture of the Components (I) and (II) of the present two component hybrid coating composition, a reaction may occur between the polyisocyanate and the silane terminated polyaspartate to form a compound with urea linkages. Once exposed to the atmosphere, e.g. upon application of the hybrid coating composition to a substrate, reaction is driven by the presence of atmospheric moisture and the evaporation of any solvents. The equilibrium is driven towards polymerization, e.g. condensation, of the oxysilane and/or silicone with the other reactants. Additional water from atmospheric moisture or from immersion in either fresh or sea water after partial curing can complete the reaction. The end product is a thoroughly cross-linked structure of Si—O—Si and Si—O—C bonds.

Use of solvents can be desirable because it may allow a faster reaction to occur where the precursors are miscible in the solvent and it may permit control over the reaction mixture to allow for easy application to a surface. If a solvent is used, it is preferably a volatile solvent so that quick drying of a coating formed from the reaction mixture may occur.

Exemplary of such solvents are oxygenated solvents such as esters, ethers, alcohols, ketones, glycols, and the like. Specific solvents include for example, MIBK, MEK, acetone, n-propyl ketone, methyl isoamyl ketone, methyl propyl ketone, isopropanol, isobutyl alcohol, n-butyl alcohol, ethylene glycol monobutyl ether, propylene glycol monobutyl ether, triethylamine, n-butyl acetate, ethyl 3-ethoxypropionate, pentanone, 2-ethyl hexyl acrylate, isobutyl methyl acrylamide, isobornyl acrylate, etc. A particularly preferred solvent because of its evaporation rate is n-butyl acetate. Other preferred solvents include hexyl acetate and heptyl acetate. Lower alcohols are desirable for suppressing premature gelation.

Although a solvent may be desirable, it is not required because of the low viscosity of the polymer precursors and the usual absence of pre-hydrolysis when the components are maintained in a moisture free environment with the optional addition of moisture scavengers. A sprayable, solvent-free composition may be readily prepared. Solvents may be useful when the coating composition contains high proportions of fillers, pigments, etc.

A further embodiment of the present invention is a hybrid coating composition containing:
- (I) a first Component comprising (B) a polysiloxane having a molecular weight in the range of from about 400 to 10,000, and optionally (C) at least one hydrolyzable silane; and
- (II) a second Component comprising the reaction product of (A) an N-alkoxysilylalkyl-aspartic acid ester with (D) a polyisocyanate having an average NCO functionality of 2.0 to 5.5 and an isocyanate content, based on solids, of 2 to 50 wt % and containing aliphatic polyisocyanates, (E) a catalyst, and (F) a solvent.

Component (I) of the present embodiment of the hybrid coating composition comprises polysiloxanes (B) corresponding to formula (II) as detailed above and optional hydrolyzable silanes (C) corresponding to formula (III) as detailed above.

Component (II) of the present embodiment of the hybrid coating composition comprises the reaction product of an N-alkoxysilylalkyl-aspartic acid ester (A) with a polyisocyanate (D). Suitable as the N-alkoxysilylalkyl-aspartic acid ester (A) are compounds prepared by the reaction of equimolar amounts of (i) amino-alkyl alkoxysilanes corresponding to formula (I) as detailed above and (ii) a maleic or fumaric acid ester. In preferred embodiments, the N-alkoxysilylalkyl-aspartic acid ester (A) may be N-(3-Trimethoxysilylpropyl)-aspartic acid dimethyl ester, N-(3-Trimethoxysilylpropyl)-aspartic acid diethyl ester, N-(3-Trimethoxysilylpropyl)-aspartic acid di-n-butyl ester, N-(3-Triethoxysilylpropyl)-aspartic acid dimethyl ester, N-(3-Triethoxysilylpropyl)-aspartic acid diethyl ester, and N-(3-Triethoxysilylpropyl)-aspartic acid di-n-butyl ester.

Suitable as polyisocyanate (D) in the present embodiment of the hybrid coating composition are isocyanates as detailed above. Particularly preferred are polyisocyanates containing isocyanurate groups (trimers) which have an NCO functionality of 3.0 to 4.5, a monomer content of <2 wt %. They may be prepared by the trimerization process described in EP 330,996. Suitable catalyst (E) in the hybrid coating composition of the present invention are detailed above. The catalyst (E) may be used in the coatings according to the invention in a quantity of 0.05 to 5 wt. %, preferably of 0.1 to 3 wt. %, based on the total weight of the coating composition.

Here again, for this embodiment of the hybrid coating composition, the polyisocyanates (D) are reacted with at least 0.5 to 1.5 equivalents, based on the amino groups of the N-alkoxysilylalkyl-aspartic acid esters (A) and the isocyanate groups of the polyisocyanate (D). Preferably polyisocyanates (D) are reacted with at least 0.8 equivalents and more preferably at least 0.9 equivalents, based on the amino groups of the N-alkoxysilylalkyl-aspartic acid esters (A) and the isocyanate groups of the polyisocyanate (D).

Suitable as solvent (F) in the present embodiment of the hybrid coating composition are oxygenated solvents such as esters, ethers, alcohols, ketones, glycols, and the like, as detailed above.

This embodiment of the hybrid coating composition of the present invention pre-reacts the isocyanate with the aspartic acid ester (both of Component II) to form a pre-polymer with urea linkages and methoxysilane end groups. This reaction removes the free isocyanates from solution and thus provides a two component coating with improved safety characteristics for the end user. Furthermore, each component is shelf stable when maintained in a moisture-free environment (sealed container).

In embodiments of the present invention, any of the first Component (I), the second Component (II), or both Components can include one or more materials selected from leveling agents, wetting agents, moisture scavengers, flow control agents, anti-skinning agents, antifoaming agents, fillers, adhesion promoters, viscosity regulators, plasticizers, pigments, dyes, UV absorbers, thermal stabilizers, antioxidants, and mixtures thereof.

As used herein, the term "moisture scavenger" refers to compounds that eliminate free moisture (water). Moisture scavengers are well known in the art. Non-limiting examples of suitable moisture scavengers include, for example, ethylenically unsaturated alkoxysilanes, such as vinyl trimethoxysilane, vinyl triethoxysilane, and the like. A commercially available moisture scavenger is vinyl trimethoxy silane sold under the trade name Silquest A-171®, available from Crompton Corp. of Middlebury, Conn.

It is known in the art that molecular sieves act as moisture scavengers in a wide variety of applications. Suitable molecular sieve zeolites have type A crystal structure and are alkali metal aluminosilicates having the chemical formula $(M_x[(AlO_2)_x(SiO_2)_y].(H_2O)_z$, wherein M is a metal such as sodium. Useful zeolites have a critical diameter of between 3 Å and 5 Å, and do not exclusively adsorb water. Commercially available examples of suitable zeolites include Sylosiv® A-4 (W. R. GRACE & Co., Columbia, Md.), Purmol® 4A (Zeochem LLC, Louisville, Ky.) and Molsiv® 5A (UOP LLC, Des Plaines, Ill.). Given the small particle size of the zeolites, they readily disperse when thoroughly mixed in the coating composition. Mixtures of moisture scavengers can also be used.

Non-limiting examples of plasticizers that can be used in the present invention include dioctyl phthalate (DOP) dibutyl phthalate (DBP); diisodecyl phthalate (DIDP); dioctyl adipate isodecyl malonate; diethylene glycol dibenzoate, pentaerythritol ester; butyl oleate, methyl acetylricinoleate; tricresyl phosphate and trioctyl phosphate; polypropylene glycol adipate and polybutylene glycol adipate; and the like. Such plasticizers can be used alone or in combination of two or more. When plasticizers are used, they can be used to control or obtain a desired viscosity in the first Component, the second Component, and/or the initial mixture of the first and second Components.

Non-limiting examples adhesion promoters that can be used in the present invention include epoxy resins, phenolic resins, silane and amino silane coupling agents known in the art, alkyl titanates and/or aromatic polyisocyanates.

Non-limiting examples of leveling agents that can be used in the present invention include cellulose, e.g., nitrocellulose and cellulose acetate butyrate.

Non-limiting examples of wetting agents that can be used in the present invention include glycols, silanes, anionic surfactants, and any other wetting agents known in the art.

Non-limiting examples of flow control agents, that can be used in the present invention include polyacrylic esters, non-ionic fluorinated alkyl ester surfactants, non-ionic alkylarylpolyether alcohols, silicones, and the like, as well as those available under the tradename RESIFLOW® by Estron Chemical, Inc., Parsippany, N.J., those sold under the tradename BENZOIN® by DSM, Inc.; those available under the tradename MODAFLOW® from Monsanto and those available under the tradename SURFYNOL® available from Air Products, Bethlehem, Pa.

Non-limiting examples of antiskinning agents that can be used in the present invention include lecithin, oximes, non-limiting examples being butyraldehyde oxime and methyl ethyl ketoxime, hydroqionones, non-limiting examples being 2,5-di-t-butyl-hydroquinone and the methyl esters of hydroquinone and anthraquinones.

Coating compositions of the present invention further include at least one deaerator or defoamer. As used herein, the term "deaerator" refers to compounds that are suitable for removing dissolved gases and breaking up bubbles and foam that may arise during mixing, and which are undesirable in the final coating. Defoamers/deaerators are well known in the art. In the context of the present invention, preferred deaerators include silicone-based compounds, emulsions, and mixtures, such as polysiloxanes, polysiloxanes mixed with hydrophobic solids, siloxated polyethers mixed with hydrophobic particles, and emulsions of siloxated polyethers. Particularly preferred is a polysiloxane sold under the trade name TEGO® Airex 944, available from Tego Chemie Service GmbH of Germany. Also suitable are BYK®-25, BYK®-28, and BYK®-A 530 silicone defoamers sold by BYK-Chemie GmbH of Germany.

Non-limiting examples of antifoaming agents that can be used in the present invention include those available as FOAMEX® from Rohm and Haas Company, Philadelphia, Pa., those available under the trade name BYK®, available from BYK-Chemie USA, Wallingford, Conn., and those available under the trade name FoamBrake® from BASF Corp., Mount Olive, N.J.

Non-limiting examples of fillers that can be used in the present invention include fumed silica, settling silica, silicic anhydride, silicic hydrate, talc, carbon black, limestone powder, coated and uncoated colloidal calcium carbonate, coated and uncoated ground calcium carbonate, coated and uncoated precipitated calcium carbonate, kaolin, diatomaceous earth, fired clay, clay, titanium dioxide, bentonite, organic bentonite, ferric oxide, zinc oxide, activated zinc white, and fibrous fillers such as glass fibers or filaments. The filler can have any suitable particle size, in an embodiment of the invention, the filler particle size can be from 5 nm to 10 µm, in some cases 10 nm to 5 µm, and in other cases from 25 nm to 1 µm. When fillers are used, they can be used to increase the tensile strength of the cured material.

Non-limiting examples of viscosity regulators that can be used in the present invention include alkali-soluble, acid-soluble, and hydrophobically-modified alkali-soluble or acid-soluble emulsion polymers, those available as ACRYSOL® from Rohm and Haas Company, cellulosics, modified cellulosics, natural gums, such as xanthan gum, and the like.

Non-limiting examples of pigments that can be used in the present invention include silica, calcium carbonate, magnesium carbonate, titanium oxide, iron oxide and carbon black. The pigments can have any suitable particle size. For example, in an embodiment of the invention, the filler particle size can be from 5 nm to 10 µm, in some cases 10 nm to 5 µm, and in other cases from 25 nm to 1 µm. Beyond the standard uses for pigments, which would be well known to one of skill in the art, they may also be used to increase the tensile strength of the cured material.

Non-limiting examples of dyes that can be used in the present invention include mordant dyes, i.e., dyes prepared from plants, insects, and algae, and direct dyes, non-limiting examples being those based on benzidine or benzidine derivatives.

Non-limiting examples of ultra violet light (UV) absorbers that can be used in the present invention include benzotriazole-based ultra violet ray absorbers, salicylate-based ultraviolet ray absorbers, benzophenone-based ultraviolet ray absorbers, hindered amine-based light stabilizers and nickel-based light stabilizers.

Non-limiting examples of thermal stabilizers that can be used in the present invention include HCl scavengers, a non-limiting example being epoxidized soybean oil, esters of beta-thiodipropionic acid, non-limiting examples being lauryl, stearyl, myristyl or tridecyl esters, mercaptobenzimidazole, the zinc salt of 2-mercaptobenzimidazole, zinc dibutyl-dithiocarbamate, dioctadecyl disulfide, pentaerythritol tetrakis-(beta-dodecylmercapto)-propionate, and lead phosphate.

Non-limiting examples of antioxidants that can be used in the present invention include 2,6-di-t-butyl phenol, 2,4-di-t-butyl phenol, 2,6-di-t-butyl-4-methyl phenol, 2,5-di-t-butyl hydroquinone, n-octadecyl-3-(3,5-di-t-butyl-4-hydroxyphenyl) propionate, pentaerythrityl-tetrakis[3-(3,5-di-t-butyl-4-hydroxyphenyl) propionate], 2,2'-methylenebis(4-methyl-6-t-butyl phenol), 4,4'-butylidenebis(3-methyl-6-t-butyl phenol), 4,4'-thiobis(3-methyl-6-t-butyl phenol), N,N'-diphenyl-p-phenylenediamine, 6-ethoxy-2,2,4-trimethyl-1,2-dihydroquinoline and the antioxidants available under the trade name IRGANOX® from Ciba Specialty Chemicals, Basel, Switzerland.

In the various embodiments of the present invention, the hybrid coating composition, including Component (I) and Component (II), are stable at 50° C. when maintained in a moisture free environment. As used herein, the term "stable" means that the composition does not gel or build viscosity to the point that it is no longer free flowing.

Embodiments of the present invention also provide a method of coating a substrate that includes applying the above-described hybrid coating composition to at least a portion of a surface of a substrate. The compositions can be applied by standard methods, such as brushing, spray coating, spread coating, flood coating, casting, dip coating, and roll coating. The hybrid coating compositions may be clear or pigmented.

The hybrid coating compositions as described above are mixed together in a suitable manner, and applied to an intended substrate at a thickness of from about 1 to about 30 mils, and more preferably from about 2 to about 10 mils. Preferred ranges of thickness depend on the ultimate article to be manufactured. In some embodiments, a lower film thickness will be desired, such as a coating having a thickness of about 2 to about 8 mils, or about 4 to about 6 mils. Multiple passes of a coating system, such as a spray system, may be used until the desired thickness is achieved.

The hybrid coating compositions as described above are preferably formulated to an applied coating with a tack-free time of 30 seconds to 30 minutes, more preferably 45 seconds to 15 minutes. The coating is versatile enough to be used for fast or slow systems, depending on the Components used, and the tack-free time can be adjusted up or down, depending on the needs of the user. Further, the pot life of the hybrid coating composition, which is dependent upon the nature and amount of the catalyst and the polyisocyanate mixture used, is generally at least 1 hour.

Preferably, hybrid coating compositions of the present invention are sprayed on the substrate while maintaining a volumetric ratio of from 1:10 to 10:1 for the ratio of Component I to Component II.

In one aspect of the present invention, the hybrid coating composition of the present invention may be applied to a substrate for coating of that substrate as a topcoat. A preferred field of use consists of as a topcoat for automotive OEM and automotive refinish material. The hybrid coating materials are further suitable for corrosion protection applications, for general industrial coating, the coating of wood and of furniture, for the coating of plastics, and glass coating.

Additional examples of suitable substrates include, but are not limited to, metal, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, saturated or unsaturated polyurethane composites, saturated or unsaturated polyester composites, asphalt, fiberglass, soil, or gravel.

EXAMPLES

The instant process is illustrated, but in no way restricted, by the following examples in which quantities quoted represent parts by weight or percentages by weight, unless otherwise stated.

Example 1

This example demonstrates the preparation of a silane functional aspartate according to the invention. The aspartate resin was prepared according to U.S. Pat. No. 5,364,955. To a 5-liter flask, fitted with agitator, thermocouple, nitrogen inlet, addition funnel and condenser was added 356 g (1.99 equivalents (eq.)) of 3-am inopropyltrimethoxysilane followed by 341.6 g (1.99 eq.) diethyl maleate over a two hour period at 25° C., and held at that temperature for five hours. The unsaturation number, determined by iodine titration, was 0.6, indicating that the reaction was approximately 99% complete. The amine number was 140.6 mg KOH/g resin. The viscosity was 11 cps measured using a Brookfield® Digital Viscometer, Model DV-II+, Brookfield Engineering, Inc., Middleboro, Mass., spindle 52, 100 rpm at 25° C.

Example 2

A two component hybrid coating composition according to the present invention was prepared using the raw materials listed below in Table 1. The N-(3-Trimethoxysilylpropyl)-aspartic acid diethyl ester was prepared as in Example 1. Dow Corning® 3074 Intermediate is a methoxy-functional polysiloxane, Kronos® 2310 is a titanium dioxide pigment, Sylosiv® A-4 is a moisture scavenger, and Desmodur® N-3390 is an aliphatic polyisocyanate based on an HDI trimer. The two component hybrid coating composition in Table 1 was mixed and spay coated onto a substrate. The composition demonstrated a pot life of greater than 2 hours, yet came to a hard dry within 15 minutes (23° C., 50% humidity) showing a gloss of 74 at 60 degrees.

Weatherability testing using ASTM D4587 "Standard Practice for Fluorescent UV-Condensation Exposures of Paint and Related Coatings" in a Q-Lab QUV/SE on this sample showed good gloss retention over the 4000 hour test cycle (14% loss; Table 2). This is comparable to epoxy polysiloxane resins that are commercially available, such as PPG Industries PSX® 700, which showed a 20% loss over the same time period. Additionally, pendulum hardness testing using ASTM D4366-95 "Standard Test Methods for Hardness of Organic Coatings by Pendulum Damping Tests" showed an average damping of 93.5 swings which correlates to a 130.9 second damping time.

TABLE 1

Hybrid Coating Composition

| Raw material | Weight | Volume | Weight solids | Volume solids |
| --- | --- | --- | --- | --- |
| Component I | | | | |
| N-(3-Trimethoxysilylpropyl)-aspartic acid diethyl ester | 23.63 | 2.65 | 23.63 | 2.65 |
| Dow Corning ® 3074 | 23.63 | 2.65 | 23.63 | 2.45 |
| Methyl trimethoxy silane | 2 | 0.25 | 2 | 0.25 |
| Kronos ® 2310 | 24.19 | 0.73 | 24.19 | 0.73 |
| n-Butyl Acetate | 9.96 | 1.35 | 0 | 0 |
| Sylosiv ® A-4 | 1 | 0.06 | 1 | 0.06 |
| Subtotal I | 84.41 | 7.49 | 74.45 | 6.14 |
| Component II | | | | |
| Desmodur ® N-3390 | 14.68 | 1.58 | 13.21 | 1.36 |
| 1,5-Diazobicyclo[4.3.0]non-5-en | 0.91 | 0.1 | 0.91 | 0.1 |
| Subtotal II | 15.59 | 1.65 | 14.12 | 1.45 |
| Total | 100 | 9.14 | 88.57 | 7.59 |

Theoretical Results

| Weight Solids | 88.57 | Wt/gal | 10.94 |
| --- | --- | --- | --- |
| Volume Solids | 83.01 | Mix ratio (volume) | 4.53:1 |
| P/B | 0.40 | NCO:OH | 1.05 |
| PVC | 10.10 | Theoretical VOC | 1.25 |

TABLE 2

ASTM D4587 test results-Hybrid Coating Composition

| Hours | gloss | % retention | Delta E |
| --- | --- | --- | --- |
| 0 | 73.9 | 100.0 | |
| 500 | 72.5 | 98.0 | 0.8 |
| 1000 | 72.7 | 98.4 | 0.8 |
| 1500 | 71.9 | 97.3 | 0.8 |
| 2000 | 69.9 | 94.5 | 0.9 |
| 3000 | 66.6 | 90.0 | 0.8 |
| 4000 | 63.5 | 85.8 | 0.7 |

Example 3

An alternate two component hybrid coating composition according to the present invention was prepared using the raw materials listed below in Table 3. The N-(3-Trimethoxysilylpropyl)-aspartic acid diethyl ester was prepared as in Example 1. Dow Corning® 3074 Intermediate is a methoxy-functional polysiloxane, Kronos® 2310 is a titanium dioxide pigment, Sylosiv® A-4 is a moisture scavenger, and Desmodur® N-3390 is an aliphatic polyisocyanate based on an HDI trimer.

TABLE 3

Alternate Hybrid Coating Composition

| Raw material | Weight |
|---|---|
| Component I | |
| Dow Corning ® 3074 | 23.63 |
| Methyl trimethoxy silane | 2 |
| Kronos ® 2310 | 24.19 |
| n-Butyl Acetate | 9.96 |
| Sylosiv ® A-4 | 1 |
| Subtotal I | 60.78 |
| Component II | |
| N-(3-Trimethoxysilylpropyl)-aspartic acid diethyl ester/Desmodur ® N-3390 prepolymer | 38.31 |
| 1,5-Diazobicyclo[4.3.0]non-5-en | 0.91 |
| Subtotal II | 39.22 |
| Total | 100 |

Example 4

Several two component hybrid coating compositions according to the present invention (Table 4) were formulated, mixed and spay coated onto a substrate. The N-alkoxysilylalkyl-aspartic acid ester was generated using either gamma-aminopropyl trimethoxysilane or gamma-aminopropyl triethoxysilane and the catalyst was either 1,5-Diazobicyclo[4.3.0]non-5-en or Dibutyltin dilaurate.

The set-to-touch (STT) and hard dry (HD) times were recorded at 23° C. and 50% humidity. The results found in Table 3 clearly show that dry times depend not only on the catalyst amount (compare STT and HD times for formulations C and E), but also on the choice of N-alkoxysilylalkyl-aspartic acid ester (compare STT and HD times for formulations A and B).

TABLE 4

Hybrid Coating Compositions

| Raw material | Weight (g) | | | | | |
|---|---|---|---|---|---|---|
| | A | B | C | D | E | F |
| Component I | | | | | | |
| N-(3-Trimethoxysilylpropyl)-aspartic acid diethyl ester | 23.63 | | 23.63 | | 23.41 | |
| N-(3-Triethoxysilylpropyl)-aspartic acid diethyl ester | | 24.16 | | 24.15 | | 23.93 |
| Dow Corning ® 3074 | 23.63 | 24.16 | 23.63 | 24.15 | 23.41 | 23.93 |
| Methyl trimethoxy silane | 2.00 | 2.00 | 2.00 | 2.00 | 1.98 | 1.98 |
| Kronos ® 2310 | 24.19 | 24.19 | 24.19 | 24.18 | 23.97 | 23.96 |
| n-Butyl Acetate | 9.96 | 10.09 | 9.98 | 10.10 | 9.89 | 10.01 |
| Sylosiv ® A-4 | 1.00 | 1.00 | 1.00 | 1.00 | 0.99 | 0.99 |
| Subtotal I | 84.41 | 84.60 | 84.41 | 85.30 | 83.65 | 84.80 |
| Component II | | | | | | |
| Desmodur ® N-3390 | 14.68 | 13.51 | 14.68 | 13.51 | 14.54 | 13.39 |
| 1,5-Diazobicyclo[4.3.0]non-5-en | 0.91 | 0.91 | | | | |
| Dibutyltin dilaurate | | | 0.91 | 0.91 | 1.80 | 1.80 |
| Subtotal II | 15.59 | 14.42 | 15.59 | 14.42 | 16.34 | 15.19 |
| Total | 100 | 99.02 | 100 | 99.72 | 99.99 | 99.99 |
| Theoretical Results | | | | | | |
| Weight Solids | 88.57 | 88.56 | 88.56 | 88.55 | 88.66 | 88.65 |
| Volume Solids | 83.01 | 83.01 | 83.01 | 83.01 | 83.20 | 83.20 |
| P/B | 0.40 | 0.40 | 0.40 | 0.40 | 0.40 | 0.40 |
| PVC | 10.10 | 10.09 | 10.10 | 10.09 | 10.10 | 10.09 |
| Wt/gal | 10.94 | 10.93 | 10.92 | 10.92 | 10.90 | 10.89 |
| Mix ratio (volume) | 4.53:1 | 4.98:1 | 4.51:1 | 4.96:1 | 4.24:1 | 4.63:1 |
| NCO:OH | 1.05 | 1.05 | 1.05 | 1.05 | 1.05 | 1.05 |
| Theoretical VOC | 1.25 | 1.25 | 1.25 | 1.25 | 1.24 | 1.24 |
| Test Results | | | | | | |
| Set-to-touch (STT) - hours | 0.12 | 0.5 | 3 | >24 | 2 | >24 |
| Hard-Dry (HD) - hours | 0.25 | 5.5 | 8 | >24 | 4.5 | >24 |

Example 5

A comparative two component polyurea coating composition was formulated as listed in Table 5. Desmophen® NH 1420 is an amino-functional polyaspartate and Desmodur® N-75 is an aliphatic polyisocyanate, both available from Bayer MaterialScience, LLC (Pittsburgh, Pa.); Byk®-307 is a wetting agent; Tinuvin® 292 and Tinuvin® 1130 are light stabilizers from BASF.

TABLE 5

Polyaspartate Coating Composition (comparative example)

| Raw material | Weight | Volume | Weight solids | Volume solids |
|---|---|---|---|---|
| Component I | | | | |
| Desmophen ® NH 1420 | 10.59 | 1.2 | 10.59 | 1.2 |
| Amyl Acetate | 2.75 | 0.36 | 0 | 0 |
| Byk ®-307 | 0.47 | 0.06 | 0.05 | 0.01 |
| Tinuvin ® 292 | 0.19 | 0.02 | 0.19 | 0.02 |
| Tinuvin ® 1130 | 0.37 | 0.04 | 0.37 | 0.04 |
| Subtotal I | 14.37 | 1.7 | 11.2 | 1.27 |
| Component II | | | | |
| Desmodur ® N-75 | 10.63 | 1.2 | 7.97 | 0.84 |
| Subtotal II | 10.63 | 1.2 | 7.97 | 0.84 |
| Total | 25 | 2.9 | 19.17 | 2.11 |
| Theoretical Results | | | | |
| Weight Solids | 76.66 | Wt/gal | | 8.61 |
| Volume Solids | 72.49 | Mix ratio (volume) | | 1.42:1 |
| P/B | 0 | NCO:OH | | 1.1 |
| PVC | 0 | Theoretical VOC | | 2.01 |

Example 6

The chemical resistance properties of a hybrid coating composition according to the present invention (Table 1) and the comparative polyurea coating (Table 5) were tested using exposure to several standard acids. Results are graded based on the physical effect of the acid after a specific period of exposure time as described and shown in Table 6. The hybrid coating composition of the present invention showed superior resistance to chemical exposure when compared to the polyurea coating composition (comparative example).

TABLE 6

Chemical Resistance Testing

Hybrid Coating (Table 1)

| Exposure condition | 1 hour | 4 hour | 6 hours | 9 hours | 24 hours |
|---|---|---|---|---|---|
| H₂SO₄ (50%) | NE | NE | NE | NE | DG |
| H₂SO₄ (10%) | NE | NE | NE | NE | NE |
| HCl (37%) | NE | NE | NE | LF | LF |
| HCl (10%) | NE | NE | NE | NE | NE |
| CH₃CO₂H (50%) | NE | LF | LF | LF | LF |
| CH₃CO₂H (10%) | NE | NE | NE | NE | B |

TABLE 6-continued

Chemical Resistance Testing

2K Polyurethane Coating (comparative example- Table 5)

| Exposure condition | 1 hour | 3 hour | 24 hours |
|---|---|---|---|
| H₂SO₄ (50%) | S | S | LF |
| H₂SO₄ (10%) | NE | NE | NE |
| HCl (37%) | DG/LF | LF | LF |
| HCl (10%) | NE | NE | DG/B |
| CH₃CO₂H (50%) | S | B | LF |
| CH₃CO₂H (10%) | NE | NE | DG/B |

LF Lifted Film
DG Down Gloss
S Soft
B Blistered
NE No Effect

It will be appreciated that the aforementioned embodiments and implementations are illustrative and various aspects of the invention may have applicability beyond the specifically described contexts. Furthermore, it is to be understood that these embodiments and implementations are not limited to the particular components, methodologies, or protocols described, as these may vary. The terminology used in the description is for the purpose of illustrating the particular versions or embodiments only, and is not intended to limit their scope in the present disclosure which will be limited only by the appended claims.

What is claimed is:

1. A hybrid coating composition containing:
(I) a first Component comprising (A) an N-alkoxysilyl-alkyl-aspartic acid ester, (B) a polysiloxane having a molecular weight in the range of from about 400 to 10,000, corresponding to the formula:

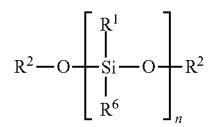

wherein R¹ and R⁶ are each independently selected from the group comprising hydroxyl, alkyl, aryl and alkoxy radicals having up to six carbon atoms, and each R² is independently selected from the group comprising hydrogen, alkyl and aryl radicals having up to six carbons, and n is selected so that the molecular weight for the polysiloxane is in the range of from about 400 to 10,000 and optionally (C) at least one hydrolyzable silane; and
(II) a second Component comprising (D) a polyisocyanate having an average NCO functionality of 2.0 to 5.5 and an isocyanate content, based on solids, of 2 to 50 wt % and containing aliphatic polyisocyanates; and (E) a catalyst.

2. The hybrid coating composition of claim 1, wherein the N-alkoxysilylalkyl-aspartic acid ester (A) is prepared by the reaction of
(i) equimolar quantities of amino-alkyl alkoxysilanes corresponding to formula (I)

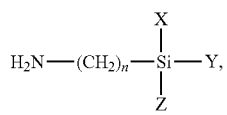 (I)

in which X, Y and Z represent identical or different organic groups which are inert with respect to isocyanate groups at a temperature below 100° C., provided that at least one of these groups is an alkoxy group, and n represents an integer of from 2 to 4, and (ii) a maleic or fumaric acid ester.

3. The hybrid coating composition of claim 1, wherein the N-alkoxysilylalkyl-aspartic acid ester (A) is selected from the group comprising N-(3-Trimethoxysilylpropyl)-aspartic acid dimethyl ester, N-(3-Trimethoxysilylpropyl)-aspartic acid diethyl ester, N-(3-Trimethoxysilylpropyl)-aspartic acid di-n-butyl ester, N-(3-Triethoxysilylpropyl)-aspartic acid dimethyl ester, N-(3-Triethoxysilylpropyl)-aspartic acid diethyl ester, and N-(3-Triethoxysilylpropyl)-aspartic acid di-n-butyl ester.

4. The hybrid coating composition of claim 1, wherein $R^1$ and $R^2$ are methyl and $R^6$ is phenyl.

5. The hybrid coating composition of claim 1, wherein the at least one hydrolyzable silane (C) corresponds to formula (III)

 (III), wherein X represents $C_1$ to $C_4$ alkyl and Q represents $C_1$ to $C_8$ alkyl, phenyl, methoxy, or ethoxy, and/or a hydrolyzate/condensate obtained therefrom.

6. The hybrid coating composition of claim 1, wherein the at least one hydrolyzable silane (C) comprises methyltrimethoxysilane or a hydrolyzate/condensate obtained therefrom.

7. The hybrid coating composition of claim 1, wherein the polyisocyanate (D) has an average NCO functionality of 3.0 and 4.5.

8. The hybrid coating composition of claim 1, wherein the polyisocyanate (D) has an isocyanate content, based on solids, of 10 to 30 wt %.

9. The hybrid coating composition of claim 1, wherein the polyisocyanate (D) has a content of monomeric diisocyanates of less than 2 wt %.

10. The hybrid coating composition of claim 1, wherein the polyisocyanate (D) is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane, bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3-diisocyanate, α,α,α',α'-1,4-xylylene diisocyanate, 1-isocyanato-1-methyl-4(3)-isocyanatomethyl cyclohexane, 2,4-hexahydrotoluylene diisocyanate, 2,6-hexahydrotoluylene diisocyanate, 1,3-phenylene diisocyanate, 1,4-phenylene diisocyanate, 2,4-toluylene diisocyanate, 2,6-toluylene diisocyanate, 2,4-diphenyl-methane diisocyanate, 4,4'-diphenyl-methane diisocyanate, 1,5-diisocyanato naphthalene and mixtures thereof.

11. The hybrid coating composition of claim 1, wherein at least 0.9 amine equivalents of the N-alkoxysilylalkyl-aspartic acid ester (A) are present for each NCO equivalent of polyisocyanate (D).

12. The hybrid coating composition of claim 1, wherein the catalyst (E) is an amidine compound which has amidino functional group, —HN=$CNH_2$, or an organotin compound.

13. The hybrid coating composition of claim 1, wherein the catalyst (E) is 1,5-Diazobicyclo[4.3.0]non-5-en or dibutyltin dilaurate.

14. The hybrid coating composition of claim 1, further comprising in Component (I) one or more materials selected from the group consisting of leveling agents, wetting agents, moisture scavengers, flow control agents, anti-skinning agents, antifoaming agents, fillers, adhesion promoters, viscosity regulators, plasticizers, pigments, dyes, UV absorbers, thermal stabilizers, antioxidants, and mixtures thereof.

15. The hybrid coating composition of claim 1, further comprising a moisture scavenger which is an alkali metal aluminosilicate having the chemical formula $(M_x[(AlO_2)_x(SiO_2)_y].(H_2O)_z)$, wherein M is a metal.

16. A substrate coated with a hybrid coating composition containing:

(I) a first Component comprising (A) an N-alkoxysilyl-alkyl-aspartic acid ester, (B) a polysiloxane having a molecular weight in the range of from about 400 to 10,000 corresponding to the formula:

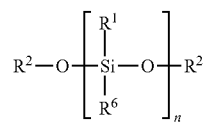

wherein $R^1$ and $R^6$ are each independently selected from the group comprising hydroxyl, alkyl, aryl and alkoxy radicals having up to six carbon atoms, and each $R^2$ is independently selected from the group comprising hydrogen, alkyl and aryl radicals having up to six carbons, and n is selected so that the molecular weight for the polysiloxane is in the range of from about 400 to 10,000, and optionally (C) at least one hydrolyzable silane; and (II) a second Component comprising (D) a polyisocyanate having an average NCO functionality of 2.0 to 5.5 and an isocyanate content, based on solids, of 2 to 50 wt % and containing aliphatic polyisocyanates; and (E) a catalyst.

17. The substrate of claim 16, wherein the substrate is comprised of metal, natural and/or synthetic stone, ceramic, glass, brick, cement, concrete, cinderblock, wood and composites and laminates thereof; wallboard, drywall, cement board, plastic, paper, PVC, styrofoam, plastic composites, acrylic composites, polyurethane composites, polyester composites, asphalt, fiberglass, soil, or gravel.

18. A method of coating a substrate, the method comprising the step of pre-mixing and applying Components I and II of a hybrid coating composition to a substrate, wherein the hybrid coating composition contains:

(I) a first Component comprising (A) an N-alkoxysilyl-alkyl-aspartic acid ester, (B) a polysiloxane having a molecular weight in the range of from about 400 to 10,000 corresponding to the formula:

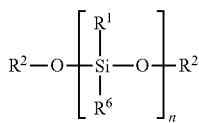

wherein $R^1$ and $R^6$ are each independently selected from the group comprising hydroxyl, alkyl, aryl and alkoxy radicals having up to six carbon atoms, and each $R^2$ is independently selected from the group comprising hydrogen, alkyl and aryl radicals having up to six carbons, and n is selected so that the molecular weight for the polysiloxane is in the range of from about 400 to 10,000, and (C) at least one hydrolyzable silane; and (II) a second Component comprising (D) a polyisocyanate having an average NCO functionality of 2.0 to 5.5 and an isocyanate content, based on solids, of 2 to 50 wt % and containing aliphatic polyisocyanates; and (E) a catalyst.

19. The method of claim 18, wherein the coating composition is sprayed on the substrate while maintaining a volumetric ratio of from 1:10 to 10:1 for the ratio of Component I to Component II.

20. The method of claim 18, wherein the coating is applied to the substrate in a thickness of 1 to 20 mils.

21. The method of claim 18, wherein the coating is applied to the substrate in a thickness of 4 to 6 mils.

22. A hybrid coating composition containing:
(I) a first Component comprising (A) an N-alkoxysilyl-alkyl-aspartic acid ester, (B) a polysiloxane having a molecular weight in the range of from about 400 to 10,000, corresponding to the formula:

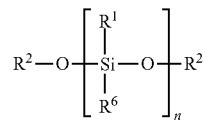

wherein $R^1$ is methyl and $R^6$ is phenyl, and each $R^2$ is methyl, and n is selected so that the molecular weight for the polysiloxane is in the range of from about 400 to 10,000 and optionally (C) at least one hydrolyzable silane; and (II) a second Component comprising (D) a polyisocyanate having an average NCO functionality of 2.0 to 5.5 and an isocyanate content, based on solids, of 2 to 50 wt % and containing aliphatic polyisocyanates; and (E) a catalyst.

* * * * *